United States Patent [19]

Wilcox

[11] 4,149,179

[45] Apr. 10, 1979

[54] CIRCUIT FOR GENERATING TV COLOR BURST GATE

[75] Inventor: Milton E. Wilcox, San Jose, Calif.

[73] Assignee: National Semiconductor Corporation, Santa Clara, Calif.

[21] Appl. No.: 808,751

[22] Filed: Jun. 22, 1977

[51] Int. Cl.² .............................................. H04N 9/46
[52] U.S. Cl. ..................................... 358/20; 328/58; 307/265; 307/271; 307/354
[58] Field of Search ................... 358/20, 19; 328/34, 328/58; 307/354, 237, 265, 266, 268, 271

[56] References Cited

U.S. PATENT DOCUMENTS

| | | | |
|---|---|---|---|
| 2,985,836 | 5/1961 | Hatton | 328/54 |
| 3,073,971 | 1/1963 | Daigle, Jr. | 328/58 |
| 3,135,826 | 6/1964 | Moles et al. | 358/20 |
| 3,492,602 | 1/1970 | Berwin et al. | 307/265 |
| 3,610,956 | 10/1971 | Giordano et al. | 328/116 |
| 3,614,303 | 10/1971 | Krause | 358/19 |
| 3,757,230 | 9/1973 | Keeney, Jr. | 307/354 |
| 3,835,419 | 9/1974 | Milne et al. | 307/271 |

Primary Examiner—Robert L. Griffin
Assistant Examiner—Joseph A. Orsino, Jr.
Attorney, Agent, or Firm—Gail W. Woodward

[57] ABSTRACT

In a color television receiver a pulse is generated corresponding to the horizontal beam deflection flyback interval. This pulse is coupled to a gating transistor and to an integrator. The integrator output is a sawtooth signal that is fed to a zero-crossing detector, the output of which is also coupled to the gating transistor. The gating transistor will then generate a pulse that corresponds to the second half of the flyback pulse and is therefore a nearly ideal source of color burst gate pulse.

7 Claims, 3 Drawing Figures

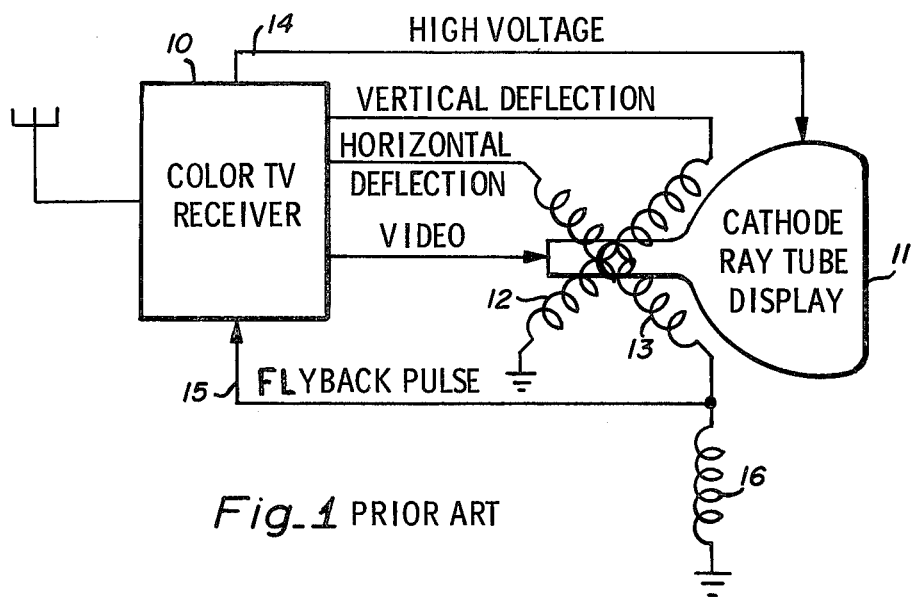
Fig_1 PRIOR ART
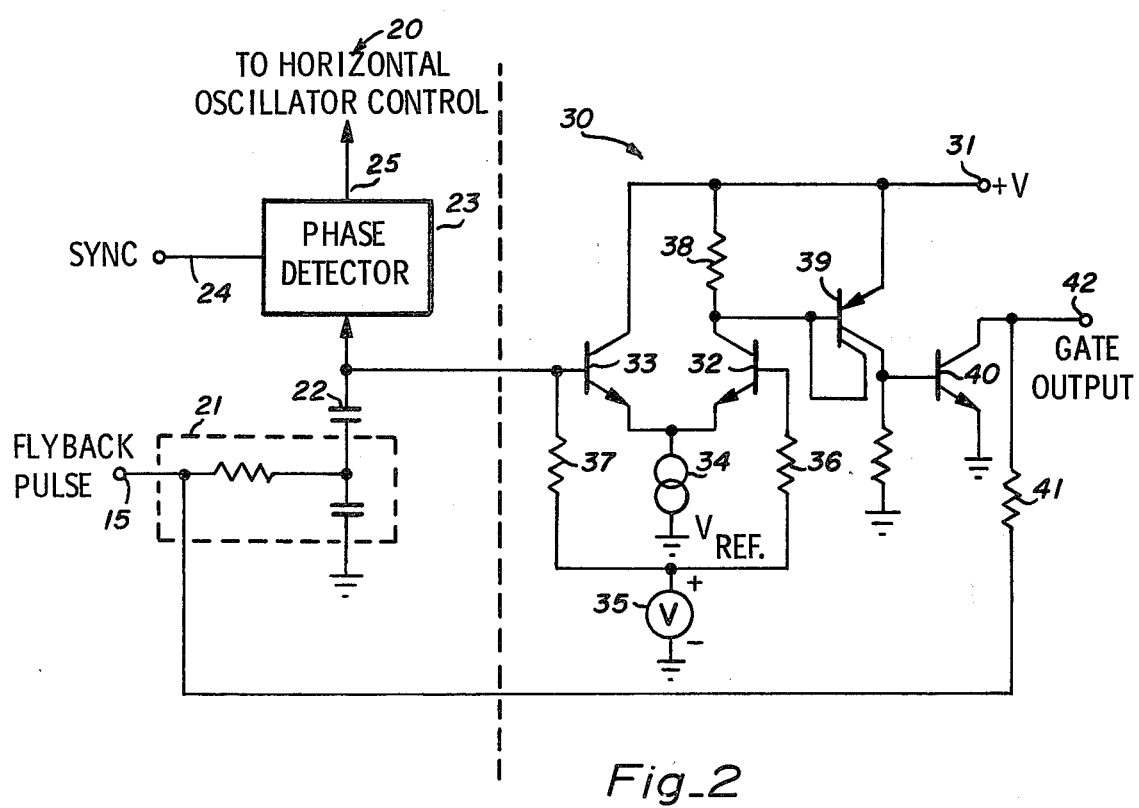
Fig_2

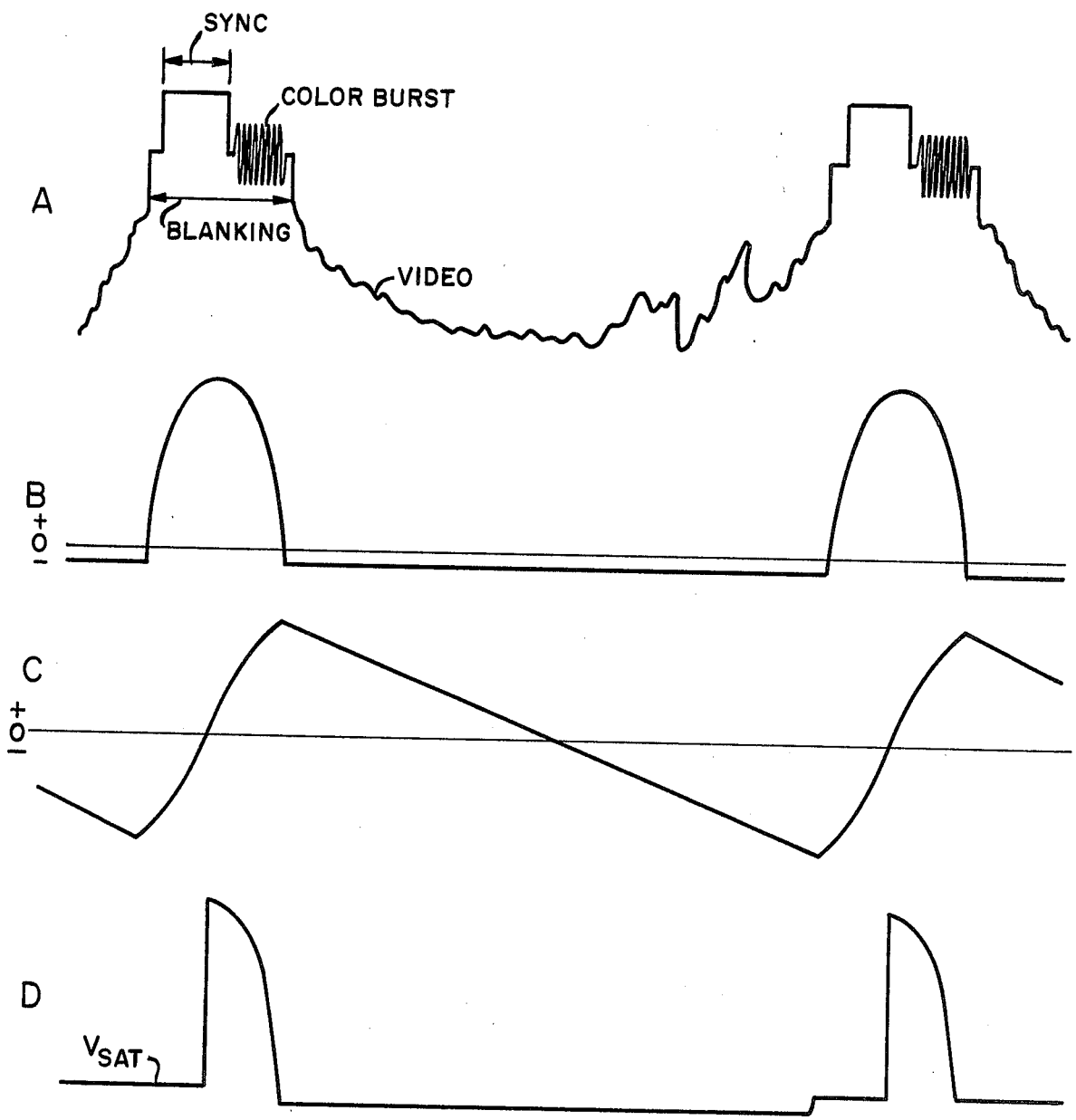
Fig_3

CIRCUIT FOR GENERATING TV COLOR BURST GATE

BACKGROUND OF THE INVENTION

In a color TV video signal the color subcarrier reference is transmitted during the horizontal blanking interval. An eight cycle burst of 3.58 MHz (approximately) reference is located subsequent to the synchronizing pulse on what is called the "back porch" of the blanking portion of the composite video waveform. This signal is used to phase lock a color subcarrier oscillator that provides the carrier used to demodulate the transmitted color signals. Desirably this burst signal is gated out of the composite video so that only the burst information is available for phase locking the subcarrier oscillator. It is important that the burst gate occurs during the horizontal blanking interval and that it be wide enough to embrace all of the burst gate interval yet narrow enough to exclude undesired signals. For example, if the burst gate overlaps into the video portion of the composite signal, color phase errors can develop to produce incorrect the response.

In the prior art the simplest approach has been to use the blanking pulse for color burst gating. This makes the circuit susceptible to any interference signal located inside the blanking interval. Therefore a narrower gating pulse is desired. Accordingly, numerous pulse shaping means have been employed to generate a suitable waveform. For example, in one approach the sync pulse is delayed and used as the gating signal. Alternatively, the trailing edge of the sync pulse is used to initiate a pulse generating circuit. One major problem associated with the above methods is that they start with transmitted video signals and are therefore subject to transmission noise and errors. It is generally preferred to employ the TV display flyback pulse as a blanking signal source. Since this source is independent of the signal channel, it provides a much cleaner signal less subject to noise and transmission errors. However, since the flyback pulse is almost as wide as the blanking pulse, it is not ideal. Accordingly, wave shaping is commonly employed and the resulting circuits have proven to be complicated and difficult to implement.

SUMMARY OF THE INVENTION

It is an object of the invention to provide a circuit for burst gate pulse generation starting with a flyback pulse and employing simple circuitry to shape the burst gate.

It is a further object of the invention to utilize existing TV circuitry to generate a burst gate with a minimum of added wave shaping circuitry.

These and other objects are achieved in the following manner. In a conventional TV receiver the horizontal phase detector typically employs a sawtooth waveform obtained by integrating a pulse corresponding to the horizontal deflection flyback interval. In the invention the flyback pulse is coupled to the collector of a clamping transistor. The sawtooth waveform is coupled to a zero-crossing detector the output of which is coupled to the base of the clamping transistor. The zero-crossing detector holds the clamping transistor conductive until the center of the flyback pulse is reached, whereupon the clamping transistor is turned off. The collector then rises to the flyback pulse level. Thus the clamping transistor output comprises the second half of the flyback pulse as the burst gate. By selecting a suitable level on this pulse, a color burst gate is available for extracting this signal from the composite video.

BRIEF DESCRIPTION OF THE DRAWING

FIG. 1 is a block diagram showing a color television receiver coupled to a cathode ray tube display;

FIG. 2 is a schematic diagram of the critical circuitry of the invention; and

FIG. 3 is a waveform sequence showing the timing relationship of the various signals.

DESCRIPTION OF THE INVENTION

FIG. 1 is a block diagram of a color TV receiver of conventional design. Block 10 designates the receiver circuitry that couples to a display such as a cathode ray tube (CRT) 11. Deflection coils 12 and 13 are used to magnetically deflect the CRT beam in response to vertical and horizontal deflection signals generated in the receiver circuits. The receiver also produces high voltage on line 14 and applies video to operate CRT 11. While not shown, other conventional operating potentials are applied to CRT 11. A so called flyback pulse is available in the receiver on line 15. While other means of generation of such a pulse are available, inductor 16, which is coupled in series with deflection coil 13, will develop a suitable pulse. The flyback pulse is a half sinewave shape occurring during the horizontal CRT retrace interval. Typically inductor 16 is selected to have a value to produce a reactance at the horizontal deflection frequency that is small in comparison to the reactance of the deflection coil.

In a typical color TV receiver the flyback pulse is positive going and is used in various blanking and/or gating functions. In one application, the flyback pulse is integrated and the resulting sawtooth waveform used to operate the horizontal automatic frequency control (AFC) circuit. This is indicated in section 20 of FIG. 2 (to the left of the dashed line). The flyback pulse, which has the shape of waveform B of FIG. 3, is integrated by R-C integrator 21. This yields a sawtooth waveform C of FIG. 3. In waveform B the zero reference is only sightly above the negative waveform portion because the pulse areas above and below zero must be equal. Upon integration as in waveform C the sawtooth is symmetrically located about the zero axis. This means that the zero crossing is located in the center of the flyback pulse. It should be noted that in waveform B the flyback pulse is a half sine wave. Accordingly, the integrated version will be a half cosine wave as shown.

The sawtooth waveform is normally applied to phase detector 23, which is also supplied with sync pulses on line 24. The output of phase detector 23 is applied via line 25 to the horizontal oscillator control circuit. The thus produced automatic frequency control operates the CRT deflection so that flyback waveform B of FIG. 3 is aligned with the received signal composite video is shown for comparison in waveform A. Normally the flyback pulse occurs within the blanking interval shown on waveform A.

The Federal Communication Commission has established in Part 73 of the Rules and Regulations, the specifications of the composite video signal as broadcast. The waveform A of FIG. 3, while not precisely to scale, portrays the essential features of the presently required signal. The sync pulse is disposed on top of the blanking pulse and extends slightly past the center of the blanking pulse. An eight cycle color burst signal is located between the end of the sync pulse and the end of the blanking pulse. This burst is a sample of the color subcarrier used at the transmitter to generate the color signals. While not shown in detail, the TV receiver uses this color subcarrier burst to phase lock an oscillator that will be used in the color signal demodulators. With only eight cycles available, it is important that the color burst be available to the utilization circuitry with minimum contamination by other signals. Ideally the burst would be gated out of the composite video by a pulse that exactly brackets the burst. If the flyback pulse of waveform B of FIG. 3 were to be used, the sync pulse along with any noise in the blanking interval would also be gated out. It turns out that there is no ideal pulse available in the TV receiver for burst gating and pulse manipulation circuitry for generating such a pulse is ordinarily complicated.

In portion 30 of FIG. 2 (to the right of the dashed line) a simple circuit suitable for implementation in a monolithic integrated circuit is present to be added to a TV receiver for the burst gating function. The circuit is operated from a power supply coupled between +V at terminal 31 and ground.

Transistors 32 and 33 are connected as a differential amplifier. Current source 34 sets the differential amplifier current. Constant voltage source 35 establishes $V_{REF}$ for the bases of transistors 32 and 33 via resistors 36 and 37. Since the base of transistor 33 is coupled by capacitor 22 to integrator 21, the zero reference of waveform C of FIG. 3 would be at $V_{REF}$ at the base of transistor 33.

Resistor 38 acts as the differential amplifier output load and transistor 39 is directly coupled thereto. Since one collector of transistor 39 is coupled to its base, the second collector will couple an output current equal to the input current to the base of transistor 40. The collector of transistor 40 is coupled via resistor 41 to the flyback pulse at terminal 15 which represents waveform B of FIG. 3.

When waveform C is in its negative swing or below $V_{REF}$ transistor 33 will be off and transistor 32 will be on. This will turn transistor 39 on and saturate transistor 40 which acts as a clamping device. Thus the base line of the output at terminal 42 will be at $V_{SAT}$ as shown in waveform D of FIG. 3. As waveform C passes through zero in the positive-going direction, transistor 33 turns on and transistor 32 turns off. This turns off transistor 39 and transistor 40. The voltage at terminal 42 will rapidly rise to the peak value of waveform B. The voltage of terminal 42 will then reproduce waveform 8 back to the base line or slightly below ground until the next positive excursion of waveform B above $V_{SAT}$.

It can be seen that the pulse of waveform D of FIG. 3 brackets the color burst of waveform A and little else. There is a slight overlap of the sync pulse, but this has little effect. It can further be seen that there is little chance of overlap beyond the edge of the blanking pulse. If desired the pulse of waveform D can be clipped at some point between $V_{SAT}$ and peak to further narrow it and reduce the likelihood of overlap in the video interval.

From the above, it can be seen that the desired gate pulse can be created with a zero-crossing detector, transistors 32 and 33, coupled to a level shift transistor 39 and a transistor clamp 40. Thus a nearly ideal gate waveform is achieved with the addition of only a few parts to a TV integrated circuit.

The invention has been described and a preferred implementation shown. Clearly there are alternatives and equivalents that would occur to a person skilled in the art. Accordingly it is intended that the invention be limited only by the claims that follow:

I claim:

1. In a color television receiver capable of responding to a color subcarrier burst signal transmitted during the horizontal blanking interval, said receiver including means for generating a flyback pulse having a duration equal to the horizontal flyback period, color burst gating pulse producing means comprising:
   integrating means responsive to said flyback pulse for generating a sawtooth voltage waveform, said sawtooth having a zero crossing located in the center portion of said flyback pulse;
   means responsive to said zero crossing to produce a control pulse; and
   means responsive to said control pulse to clamp the first half of said flyback pulse for producing an output gating pulse in time coincidence with said color subcarrier burst signal.

2. The gating pulse means of claim 1 wherein said means responsive to said zero crossing include a differential amplifier driven by said sawtooth voltage so that said differential amplifier alternates conduction between halves at said center portion of said flyblock pulse.

3. The gating pulse means of claim 2 further including a clamping section responsive to said differential amplifier and means coupling said flyback pulse to said clamping section whereby said clamping section is operated to produce a gating pulse having a leading edge coincident with said zero crossing.

4. The gating pulse means of claim 3 further including level shift means coupled between said differential amplifier and said clamping section.

5. A circuit for generating a gating pulse from a source pulse wherein said gating pulse approximates the second half of said source pulse, said circuit comprising:
   an output terminal at which said gating pulse appears;
   means for coupling said source pulse to said output terminal, said means for coupling being operative to deliver at least a portion of said source pulse to said output terminal;
   means for integrating said source pulse;
   comparator means having a reference input coupled to a source of reference potential, a signal input coupled to said integrating means, and an output; and
   clamping means coupled to said output terminal and operative to interrupt said coupling of said source pulse to said output terminal, said clamping means being operated from said comparator output, whereby said clamping means clamps the first half of said source pulse and unclamps the second half of said source pulse.

6. The circuit of claim 5 including means for a-c coupling the output of said integrating means to said comparator signal input and means for returning said signal input to said source of reference potential.

7. The circuit of claim 6 further including level shifting means coupled between said comparator output and said clamping means.

* * * * *